(12) United States Patent
Godbole (10) Patent No.: US 8,744,011 B2
(45) Date of Patent: Jun. 3, 2014

(54) WIRELESS COMMUNICATION DEVICE HAVING REDUCED POWER CONSUMPTION

(75) Inventor: Sachin Godbole, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 132 days.

(21) Appl. No.: 13/252,887

(22) Filed: Oct. 4, 2011

(65) Prior Publication Data

US 2013/0083875 A1     Apr. 4, 2013

(51) Int. Cl.
*H03K 9/00*     (2006.01)

(52) U.S. Cl.
USPC ............................... 375/316; 375/317

(58) Field of Classification Search
USPC ........................................ 375/345
See application file for complete search history.

(56) References Cited

U.S. PATENT DOCUMENTS

| | | | |
|---|---|---|---|
| 4,887,280 A * | 12/1989 | Reisenfeld | 375/377 |
| 2002/0068540 A1* | 6/2002 | Skarman et al. | 455/232.1 |
| 2005/0232136 A1* | 10/2005 | Kwak | 370/208 |
| 2006/0046668 A1* | 3/2006 | Uratani et al. | 455/127.5 |
| 2006/0121928 A1* | 6/2006 | Itsuki | 455/522 |
| 2006/0133531 A1* | 6/2006 | Iwasaki | 375/267 |
| 2007/0218936 A1* | 9/2007 | Waxman et al. | 455/522 |
| 2010/0098140 A1* | 4/2010 | Huang et al. | 375/219 |
| 2011/0122975 A1* | 5/2011 | Umeda et al. | 375/319 |
| 2013/0040647 A1* | 2/2013 | Borran et al. | 455/438 |
| 2013/0100826 A1* | 4/2013 | Namba et al. | 370/246 |

* cited by examiner

*Primary Examiner* — Santiago Garcia
(74) *Attorney, Agent, or Firm* — Sterne, Kessler, Goldstein & Fox PLLC (57) ABSTRACT

A wireless communication device is disclosed that is capable of reduced power consumption. The device includes several analog components, including some that may be capable of operating at multiple different operation powers and others whose function may be performed by an equivalent digital component. Based on a quality of a received signal, the wireless communication device can adjust a power consumption configuration of its analog components in order to optimize power use. For example, when signal quality is higher than necessary, the device can sacrifice performance to reduce operating power and/or switch to digital equivalent components. Similarly, when signal quality is lower than necessary, the device can enhance performance by increasing operating power and/or switching from digital equivalent components to corresponding analog components.

18 Claims, 9 Drawing Sheets

WIRELESS COMMUNICATION DEVICE HAVING REDUCED POWER CONSUMPTION

BACKGROUND

1. Field of Invention

The invention relates to wireless communications, and more specifically to a wireless communication device that is capable of reduced power consumption.

2. Related Art

Wireless communication devices, such as cellular telephones to provide an example, are becoming commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency modulated with encoded information. This radio frequency is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Over the years, in an effort to make wireless communication devices more portable, wireless communication devices have shrunk in both size and weight. As a consequence of portability, such devices must rely on a limited power supply (i.e., a battery) despite becoming increasingly complex and power-hungry, and must maintain low heat dissipation for handheld and travel use. Thus, significant efforts have been made to reduce power consumption in wireless communication devices in order to maximize battery life and reduce heat dissipation. As portable devices have shrunk, power consumption has been reduced primarily by reducing operating voltages of digital components, and by converting power-inefficient analog components to similar digital components.

However, many analog components, such as radio receivers/transmitters and analog front-end (AFE), do not scale with technology and cannot be converted into digital components—or can only be converted with significant performance sacrifices. For example, an analog radio receiver operates at full-power even under good signal conditions because there is no way to predict operating conditions that would enable reduced operating power. Further, although a digital implementation of a radio receiver exists, the digital implementation has performance limitations that render it insufficient for many communication conditions. Thus, the power consumption of analog components substantially affects the power consumption, and therefore the portability, of a wireless communication device.

Consequently, there is a need for a wireless communication device that can effectively reduce power consumption of its analog components without sacrificing performance. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware (e.g., circuits), firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication (specifically cellular communication), those skilled in the relevant art(s) will recognize that the present invention may be applicable to other communications that use wired or other wireless communication methods without departing from the spirit and scope of the present invention.

An Exemplary Wireless Communications Environment

Figure 1:
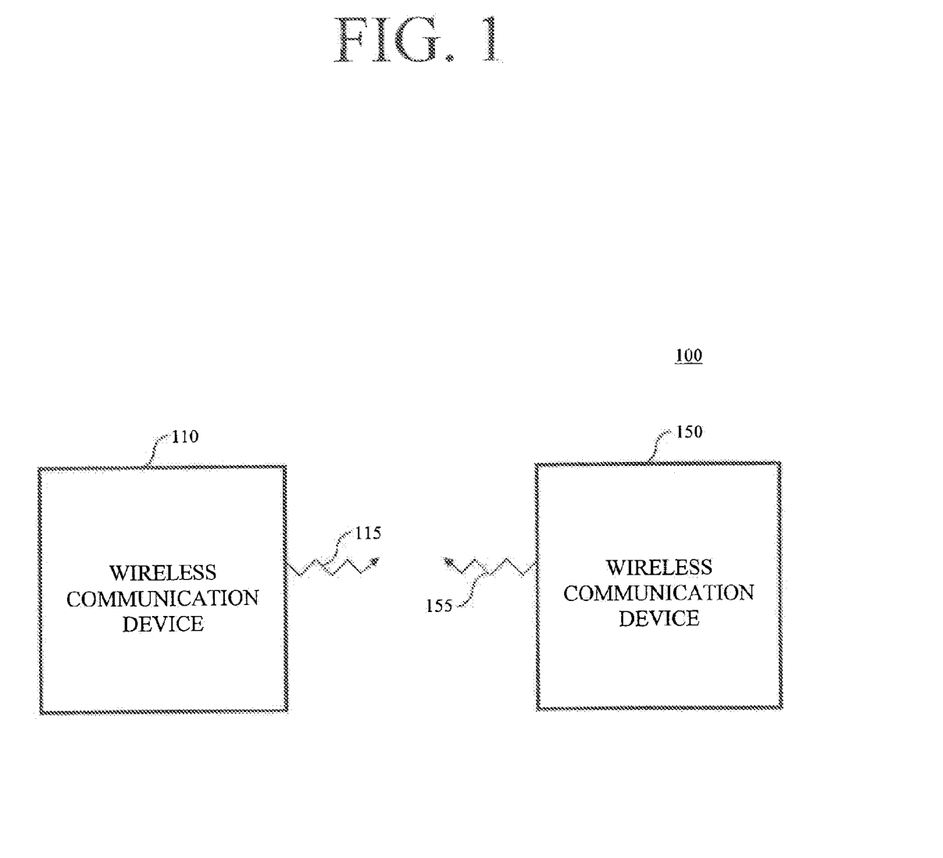
FIG. 1 illustrates a block diagram of a wireless communication environment according to an exemplary embodiment of the invention.

FIG. 1 illustrates a block diagram of a wireless communication environment 100 according to an exemplary embodiment of the invention. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

The exemplary wireless communication environment 100 includes a first wireless communication device 110 and a second wireless communication device 150. The first wireless communication device 110 may represent an exemplary embodiment of a mobile subscriber and the second wireless communication device 150 may represent an exemplary embodiment of a base station within a cellular communications network.

The first wireless communication device 110 transmits a first wireless signal 115 toward the second wireless communication device 150 using any acceptable modulation scheme. The second wireless communication device 150 receives the first wireless signal 115. The second wireless communication device 150 processes the received first communication signal and, if necessary, transmits a second wireless signal 155 back to the first wireless communication device 110. In this manner, the first wireless communication device 110 and the second wireless communication device 150 exchange information ("communicate") with one another.

A First Exemplary Wireless Communication Device

Figure 2:
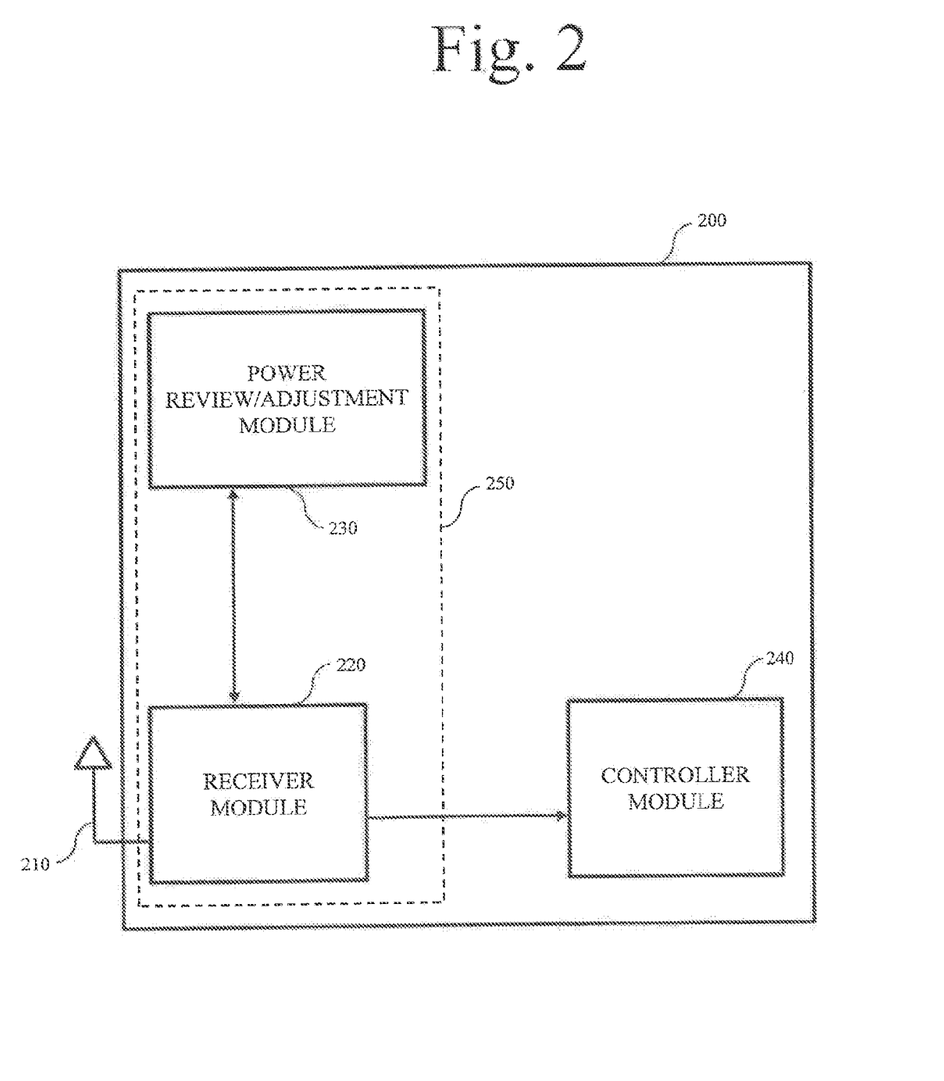
FIG. 2 illustrates a block diagram of a wireless communication device that is implemented as part of the wireless communication environment according to an exemplary embodiment of the invention.

FIG. 2 illustrates a block diagram of a wireless communication device 200 that is implemented as part of the wireless communication environment 100 according to an exemplary embodiment of the invention. The wireless communication device 200 includes a power reduction module 250 having a receiver module 220 and a power review/adjustment module 230, and may represent an exemplary embodiment of the first wireless communication device 110.

The wireless communication device 200 includes an antenna 210 that receives a signal from the wireless communication environment 100. The receiver module 220 of the power reduction module 250 performs various functions relating to the receipt of the signal. For example, the receiver module 220 can include a radio receiver and analog front-end (AFE). The power review/adjustment module 230 included in the power reduction module 250 receives the received signal from the receiver module 220. The power review/adjustment module 230 analyzes the received signal and, based on the result of the analysis, adjusts a power being supplied to (and consumed by) the receiver module 220.

After the various front end processings have been performed by the receiver module 220, the receiver module 220 forwards the received signal to a controller module 240. The controller module 240 includes the remaining functionality of the wireless communication device 200. Upon receipt of the received signal, the controller module 240 processes the information contained within the received signal and causes the wireless communication device 200 to perform a function based thereon.

An Exemplary Power Reduction Module

Figure 3:
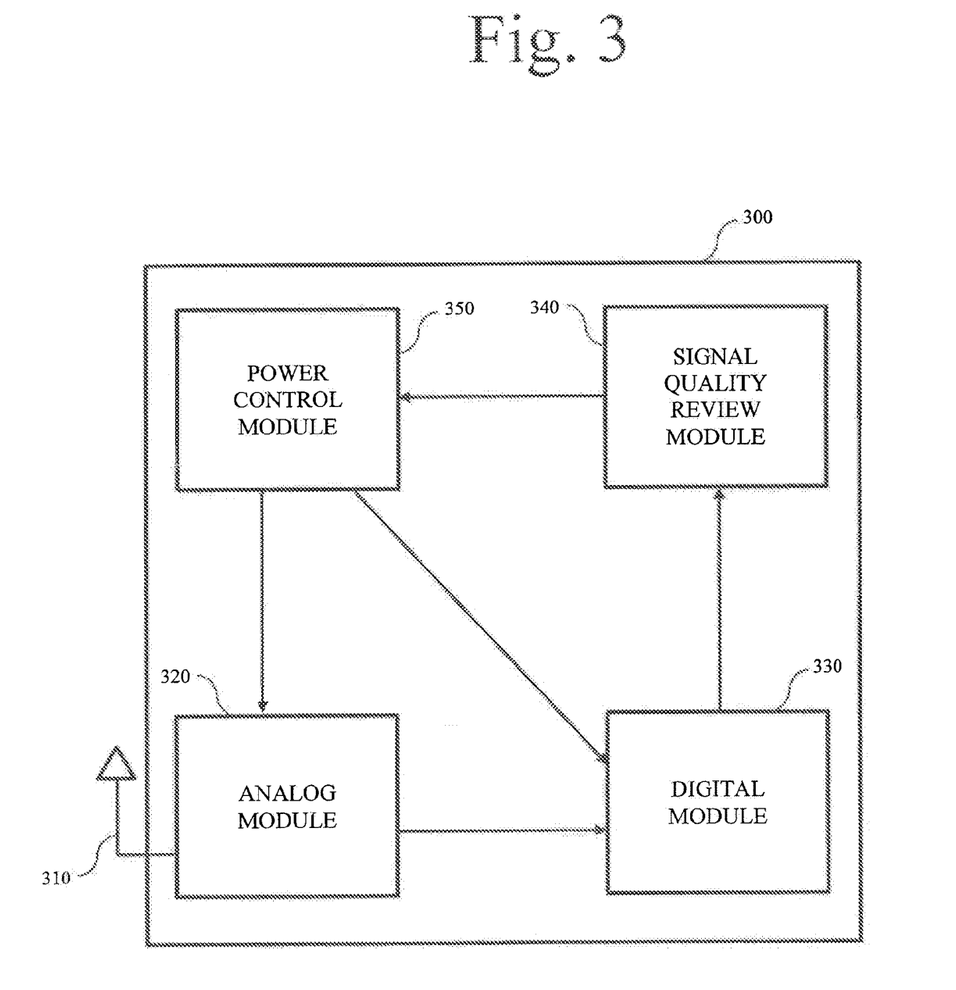
FIG. 3 illustrates a block diagram of a power reduction module that is implemented as part of the wireless communication device according to an exemplary embodiment of the invention.

FIG. 3 illustrates a block diagram of a power reduction module 300 that may be implemented as part of the wireless communication device 200 according to an exemplary embodiment of the invention. The power reduction module 300 may represent an exemplary embodiment of the power reduction module 250. For example, the power reduction module 300 includes an analog module 320 and a digital module 330 that may together represent an exemplary embodiment of the receiver module 220, and also includes a signal quality review module 340 and a power control module 350 that together may represent an exemplary embodiment of the power review/adjustment module 230.

An antenna 310 receives a signal from the wireless communication environment 100, and forwards the received signal to the analog module 320 within the power reduction module 300. The analog module 320 may include any number of analog components and/or analog sub-modules for performing various analog processings on the received signal. Preferably, the analog module 320 includes at least one analog component that can operate using any one of multiple operating powers, or that can operate anywhere within a range of operating powers. After performing its analog processings, the analog module 320 forwards the received signal to the digital module 330.

The digital module 330 includes any number of digital components and/or digital sub-modules for performing various digital processings on the received signal. Preferably the digital module 330 includes at least one digital component/sub-module that is a digital equivalent of an analog component/sub-module located in the analog module 320. After performing its digital processings, the digital module 330 forwards the received signal to the controller module 240 for processing, and also forwards the received signal to the signal quality review module 340.

The signal quality review module 340 receives the received signal from the digital module 330. Upon receipt of the signal, the signal quality review module 340 determines a signal quality of the received signal. The signal quality review module 340 can determine the signal quality by any acceptable method, including determining a signal-to-noise ratio (SNR), estimating channel conditions, measuring voltage levels, determining packet error rate, or analyzing performance costs associated with the operation of a decoder having error correcting codes (such as a convolutional decoder, or decoder using LDPC codes), as well as any other method within the spirit and scope of the invention.

Figure 4A:
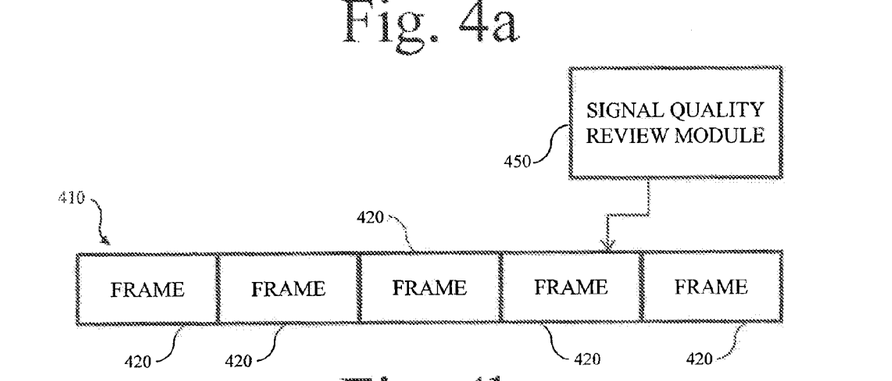
FIG. 4a illustrates a block diagram of a signal quality review module according to a first exemplary embodiment of the invention.
Figure 4B:
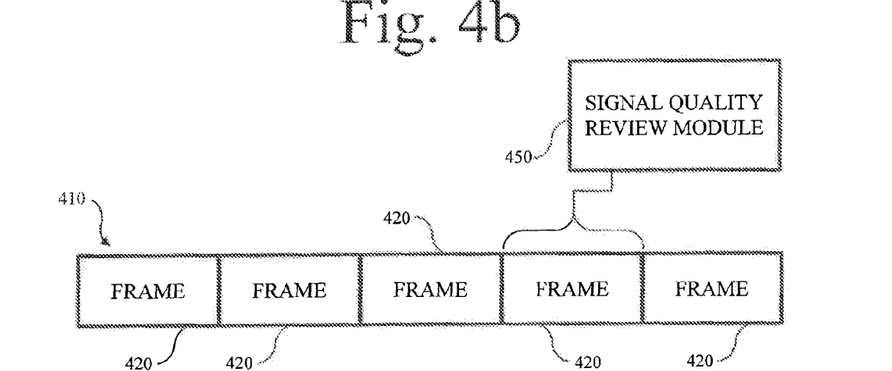
FIG. 4b illustrates a block diagram of a signal quality review module according to a second exemplary embodiment of the invention.
Figure 4C:
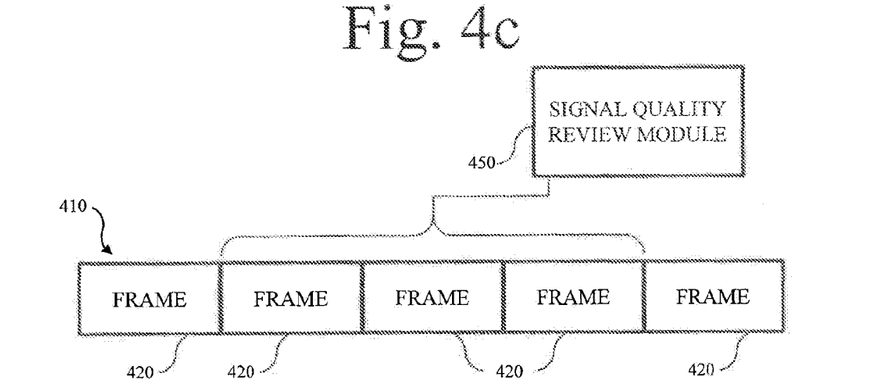
FIG. 4c illustrates a block diagram of a signal quality review module according to a third exemplary embodiment of the invention.

FIG. 4 illustrates multiple block diagrams depicting various analysis configurations of a signal quality review module 450. The signal quality review module 450 may represent an exemplary embodiment of the signal quality review module 340.

A received signal 410 typically includes a plurality of data frames 420. Depending on the type of data contained within the frames (or based on other performance factors), the signal quality review module 450 may analyze the received signal 410 at different rates. Those skilled in the relevant art(s) will recognize that a data frame of the received signal differs depending on communication scheme. For example, a frame may refer to a complete session or a packet of data transfer.

FIG. 4a shows the signal quality review module 450 continuously monitoring the received signal 410. This configuration allows the signal quality review module 450 to provide real-time analysis of the received signal 410, and allows for real-time power adjustment by the power control module 350. This configuration is particularly well-suited for unstable or rapidly-changing communication conditions.

To provide an example, in an 802.11 A, B, g, or n standard, a packet or frame can be considered as a continuous data transmission containing a plurality of data symbols. At the beginning of each packet are training fields used for detecting signal and timing information for determining symbol boundaries. The training fields may also identify a coding rate and modulation scheme, among other parameters. Based on the configuration shown in FIG. 4a, the signal quality review module 450 analyzes each symbol of the received signal 410. The power control module 350 then controls a power consumption of the analog module 320 and the digital module 330 based on the analysis of one or more symbols within the frame. Although this allows the power consumption to closely track signal quality, this configuration may cause power configuration switching issues by attempting to switch power configurations in the middle of data streams.

Alternatively, in FIG. 4b the signal quality review module 450 analyzes the received signal 410 on a frame-by-frame basis. In this manner, the signal quality review module only performs signal analysis once per frame, which reduces its power consumption. The power control module 350 can then use the analysis from the current frame to adjust the power configuration for a future frame. This configuration is particularly useful in networks where the source from which the signal is being received is constant or known. Further, this configuration avoids power configuration switching issues because the power configuration is switched between frames.

As a further alternative, in FIG. 4c the signal quality review module 450 analyzes the received signal 410 based on a group of frames. In this manner, the signal quality review module even further reduces its power consumption by performing even fewer analyses. This configuration is particularly well-suited to a relatively stable and un-changing communication channel. The power control module 350 can adjust a power consumption for future frames based on an average signal quality of the group of frames. This even further reduces power configuration switching issues because the switching is done between frames and because the new power configuration is chosen based on an average signal quality of multiple frames of data.

The analysis rate of the signal quality review module 450 can dynamically shift from one configuration to another based on fluctuations in the measured signal quality.

Referring again to FIG. 3, once the signal quality review module 340 has determined the signal quality of the received signal, the signal quality review module 340 forwards its determination to the power control module 350.

The power control module 350 receives the signal quality determination from the signal quality review module 340. The power control module then controls a power consumption of the analog module 320 and the digital module 330 based on the received signal quality determination. For example, a reduced power consumption typically results in reduced performance, whereas increased performance requires increased power consumption. Therefore, if the determined signal quality is sufficiently high that it can be processed at a reduced performance level, the power control module 350 controls the analog module 320 and the digital module 330 to reduce overall power consumption, which incidentally reduces performance. Similarly, if the determined signal quality is lower, such that more processing power is required, the power control module 350 controls the analog module 320 and the digital module 330 to increase overall power consumption, thereby increasing performance.

Those skilled in the relevant art(s) will recognize that other configurations of the power reduction module 300 are available, and may be preferred depending on the particular application. For example, the signal quality review module 340 could receive the signal from the digital module 330 (as discussed above), from an output of the analog module 320, from an input of the analog module 320 and/or from between any of the analog or digital components.

An Exemplary Receiver Module

Figure 5:
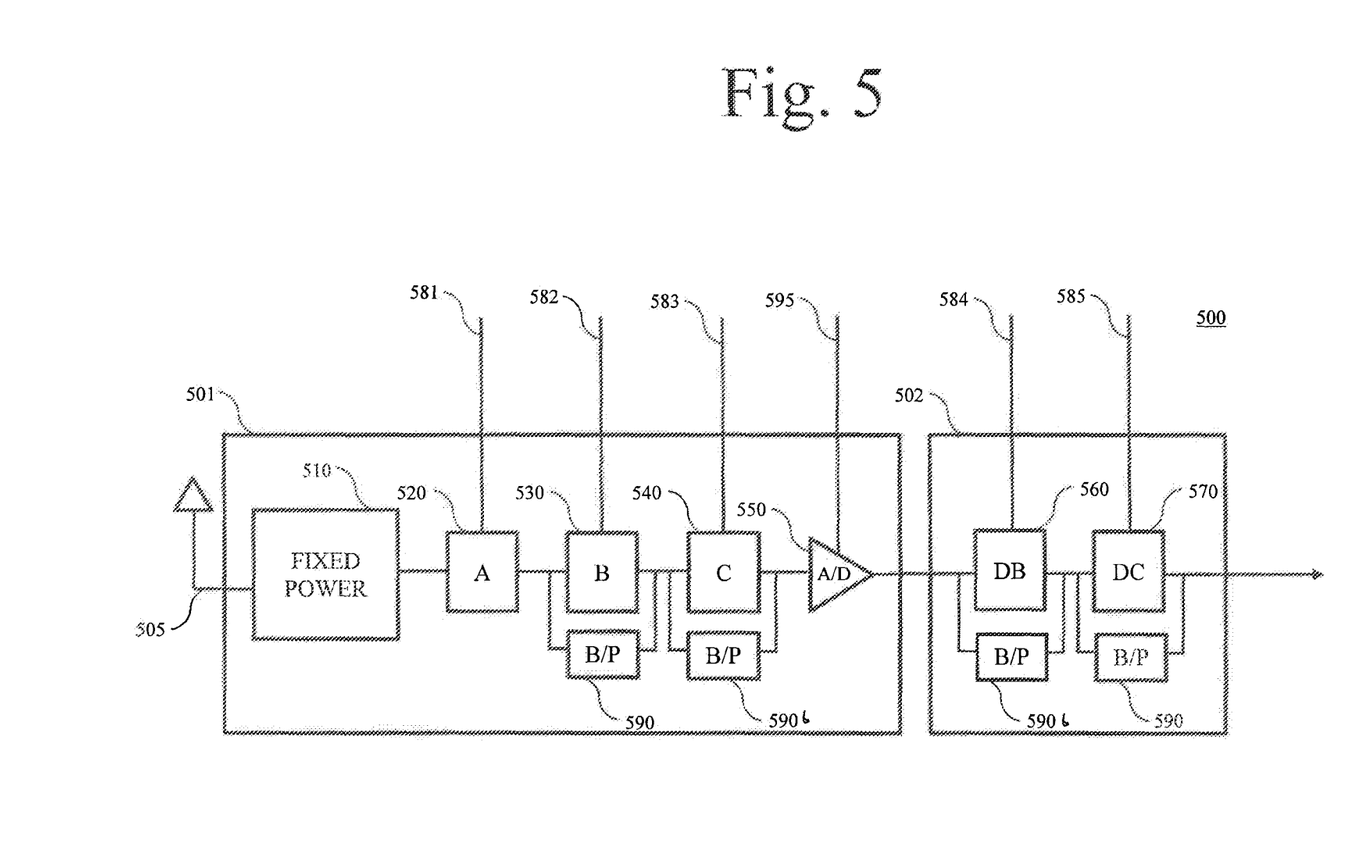
FIG. 5 illustrates a block diagram of a receiver module that is implemented as part of the wireless communication device according to an exemplary embodiment of the invention.

FIG. 5 illustrates a block diagram of a receiver module 500 that may be implemented as part of the wireless communication device 200 according to an exemplary embodiment of the invention. The receiver module 500 may represent an exemplary embodiment of the receiver module 220. For example, the receiver module 500 includes an analog module 501 that may represent an exemplary embodiment of the analog module 320, and includes a digital module 502 that may represent an exemplary embodiment of the digital module 330.

The analog module 501 includes a plurality of analog components that may have varying power consumption attributes. For example, the analog module 501 may include one or more "replaceable analog components." A replaceable analog component has a corresponding digital equivalent component that is capable of performing substantially the same function as the analog component, but using digital signals and digital electrical components. Typically, digital equivalent components require less operating power, but have worse performance under certain channel conditions, than their corresponding analog components. The analog module 501 may also include one or more "adjustable analog components." An adjustable analog component can operate at multiple operating powers, or within a range of operating powers. The performance of an adjustable analog component varies proportionally to its operating power. Thus, as operating power increases or decreases, so does performance.

The analog module 501 may also include one or more "dual components" that is both adjustable and replaceable. The operating power of a dual component may be reduced either by reducing its operating power or by substituting the analog component with its digital equivalent component. The analog module 501 may also include one or more fixed components that are neither adjustable nor replaceable. Conversely to dual components, an operating power of a fixed component cannot be reduced. The analog module 501 may also include one or more analog-to-digital (A/D) converters 550 that convert the analog signals used in the analog module 550 into digital signals for use in the digital module 502. The A/D converters may be capable of converting the signals using different bit resolutions. A higher bit resolution exhibits better performance, but requires more operating power, whereas a lower bit resolution reduces operating power, but exhibits reduced performance.

In the analog module 501, the above component types may be separated into component blocks for simplicity. For example, the analog module 501 includes a fixed power block 510 that includes any number of fixed analog components; an A-block 520 that includes any number of adjustable analog components; a B-block 530 that includes any number of replaceable analog components; and a C-block 540 that includes any number of dual analog components. In this embodiment, the component blocks are serially connected. The analog module 501 also includes the A/D converter 550 connected at an output of the analog module 501.

In the analog module 501, the adjustable component block 520, the replaceable component block 530 and the dual component block 540 are each connected to the power control module 350 via a corresponding power-supply line 581-583. The A/D converter 550 is connected to the power control module 350 via a resolution line 595. In addition, a bypass module 590 is connected around each of the component blocks capable of replacement (e.g., bypass module 590*a* is connected to replaceable component block 530 and bypass module 590*b* is connected to dual component block 540) in order to allow the received signal to bypass when the component block is in an OFF state.

The digital module 502 includes a DB-block 560 that includes the digital equivalent components of the replaceable analog component block 530, and includes a DC-block 570 that includes the digital equivalent components of the dual analog component block 540. In this embodiment, the digital component blocks are also connected in series. In the digital module 502, each of the digital equivalent blocks 560 and 570 is connected to the power control module 350 via a corresponding power-supply line 584 and 585. In addition, a bypass module 590 is connected around each of the digital equivalent component blocks in order to allow the received signal to bypass when the digital equivalent component block is in an OFF state (e.g., bypass module 590*c* is connected to DB-block 560 and bypass module 590*d* is connected to DC-block 570).

With the above configuration, the power control module 350 can adjust the power consumption of the various components using their respective power-supply lines 580 and the resolution line 585. For example, with respect to the adjustable components (block A and block C), the power control module 350 can increase or reduce power consumption by increasing or reducing, respectively, an operation power supplied to the adjustable components via their corresponding power-supply lines 581 and 583. The power control module 350 can also substitute the replaceable analog components (block B and block C) by stopping the supply of operation power to those analog blocks and supplying an operation power to the corresponding digital equivalent component blocks (block DB and block DC).

For example, in order to switch to the digital equivalent components of the B-block 530, the power control module stops a supply of an operation power to the power-supply line 582. This causes the received signal to bypass the B-block 530 via the corresponding bypass module 590. Simultaneously, the power control module supplies an operation power to the DB-block 560 via the power-supply line 584 (Those skilled in the relevant art(s) will recognize that the power-supply lines may in many circumstances be a clock line). Thus, after passing through the C-block 540 and the A/D converter 550, the signal is then processed by the DB-block 560. Because the signal was processed by the analog C-block 540, the digital equivalent DC-block 570 is an OFF state, which causes the signal output by the DB-block 560 to bypass the DC-block 570 via the bypass module 590.

In addition, with respect to the A/D converter 550, the power control module 350 can adjust its power consumption by supplying the A/D converter 550 with a conversion resolution via the resolution line 595.

With this configuration, if the power control module 350 determines that the signal quality is higher than necessary, the power control module 350 can reduce power consumption in the receiver module 500 by at least one of (1) reducing the operating power of one or more adjustable analog components, (2) substituting one or more replaceable analog components with their corresponding digital equivalent components, and (3) decreasing a bit resolution of the A/D converter, or any combination thereof. Similarly, if the power control module 350 determines that the signal quality is lower than necessary, the power control module 350 can increase power consumption of the receiver module 500 (thereby increasing performance) by at least one of (1) increasing the operating power of the adjustable analog components, (2) substituting digital equivalent components with their corresponding replaceable analog components, and (3) increasing a bit resolution of the A/D converter, or any combination thereof.

By controlling each of the analog components in accordance with the above, the power control module 350 can adjust the power consumption of the receiver module 500 between numerous different power configurations. For example, the power control module 350 can set the power consumption of the receiver module, as shown in Table 1 below:

TABLE 1

Possible Power Configurations

| Power Configuration | A Block | B Block | C Block | ADC Bit Resolution | Power | Performance |
|---|---|---|---|---|---|---|
| 1 | Full Power | Analog | Analog + Full Power | n | High | High |
| 2 | Full Power | Digital | Analog + Full Power | n | Lower than 1 | Lower than 1 |
| 3 | Low Power | Digital | Analog + Low Power | n − 1 | Lower than 2 | Lower than 2 |
| N | Minimum Power | Digital | Digital | Minimum | Low | Low |

In one embodiment, the power control module 350 can directly select a power configuration based on the received signal quality determination. In another embodiment, the power control module 350 can select a new configuration relative to a current configuration based on the received signal quality determination. For example, if the power control module 350 determines that less power is needed than the current power P, the power control module 350 can select a new power P+1. The power configurations can be stored in, and selected from, a look-up table.

In the manner described above, the device according to this embodiment is able to dynamically analyze operating conditions and adjust its power consumption as needed to properly operate within those conditions. As a result, the device is capable of reducing power consumption of its analog components, thereby increasing battery life and portability.

Those skilled in the relevant art(s) will recognize that many additional configurations will be available, and will further recognize that the listed order of power configurations is only exemplary. The actual order of power configurations will depend on the components and component types within the device. Further, those skilled in the relevant art(s) will recognize that each of the components within each block can be independently adjusted. For example, the A block may include a plurality of adjustable analog components that can each be operated at different power levels. Further, those skilled in the relevant art(s) will recognize that the bypass modules 590 may be omitted from the exemplary embodiment. By doing so, rather than turning OFF the power supplied to unwanted component blocks, the power should instead simply be reduced in order to allow for the signal to flow. Although reducing the power supplied to the component block will similarly reduce its performance (as well as a current flowing to the component block), this deficiency can be compensated for in the equivalent component block.

In addition, although the embodiment described above, as well as those below, relate to adjusting power consumption for receiving signals, the embodiments can similarly be used to adjust power configurations for transmitting signals. In fact, the transmission power adjustment may be easier because the frame type and coding rate of the transmitted signal will be known, and therefore an appropriate power configuration can be immediately selected.

A Second Exemplary Receiver Module

Figure 6:
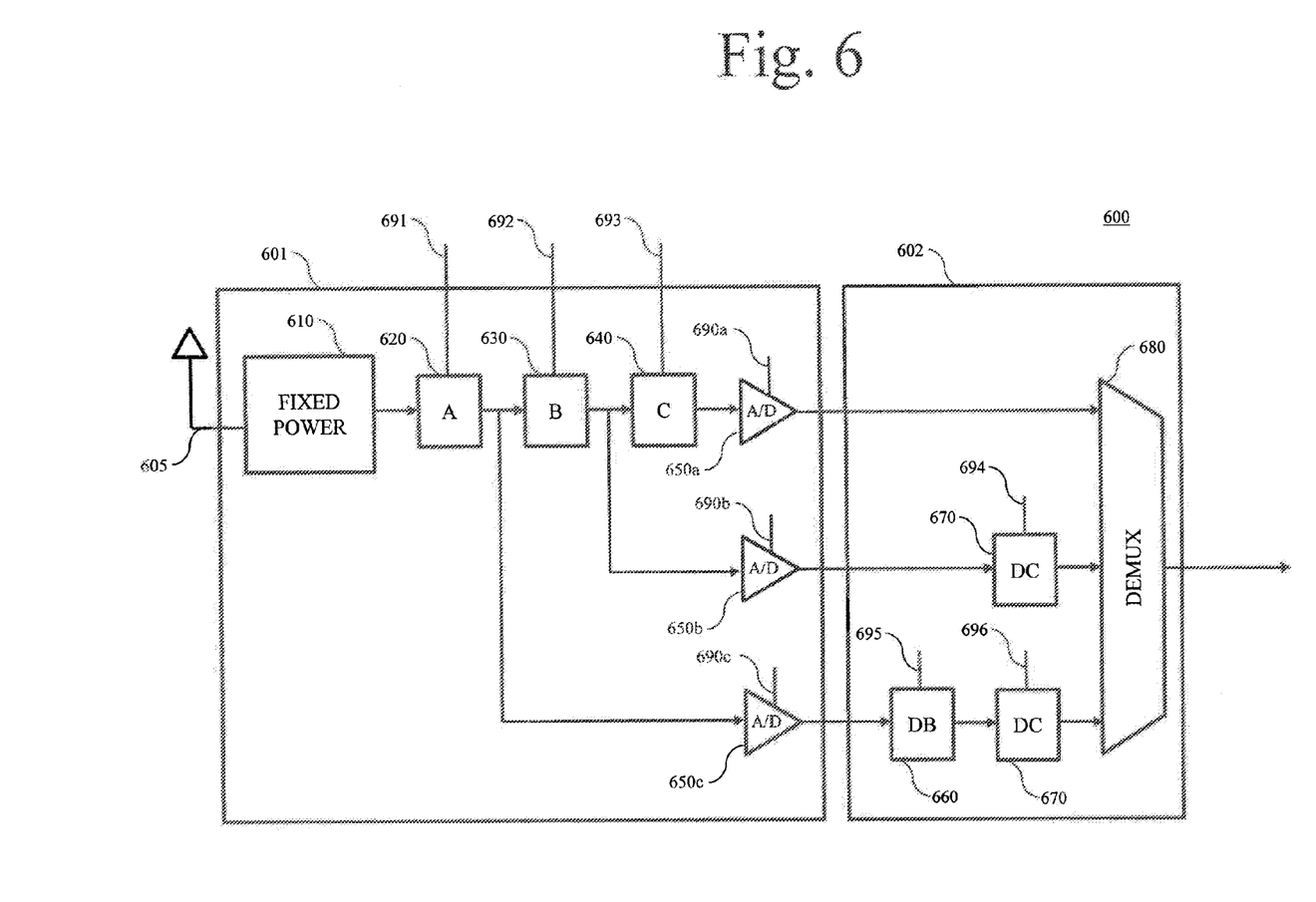
FIG. 6 illustrates a block diagram of a receiver module that is implemented as part of the wireless communication device according to a second exemplary embodiment of the invention.

FIG. 6 illustrates a block diagram of a receiver module 600 that is implemented as part of the wireless communication device 200 according to a second exemplary embodiment of the invention. The receiver module 600 may represent an exemplary embodiment of the receiver module 220. For example, the receiver module 600 includes an analog module 601 that may represent an exemplary embodiment of the analog module 320, and includes a digital module 602 that may represent an exemplary embodiment of the digital module 330.

The analog module 601 has a fixed power block 610 that includes one or more fixed analog components, an adjustable component block 620 that includes one or more adjustable analog components, a replaceable component block 630 that includes one or more replaceable analog components, and a dual component block 640 that includes one or more dual analog components. The component blocks are each connected in series, together with an A/D converter 650a. In this configuration, however, the analog module 501 includes additional A/D converters 650b and 650c that are connected in parallel with component blocks. For example, A/D converter 650b is connected in parallel with the dual component block 640 and the A/D converter 650a. Each of the A/D converters may be connected to a corresponding output line of the analog module. Each of the component blocks 620-640 is connected to the power control module 350 via a corresponding power-supply line 691-693. In addition, each of the A/D converters 650a-650c is connected to the power control module 350 via a corresponding resolution line 690a-690c.

The digital module 602 includes one or more digital equivalent blocks for each of the replaceable blocks in the analog module 601. For example, the digital module 602 includes a DB-block 660 corresponding to the B-block 630 of the analog module 601, and includes a DC-block 670 corresponding to the C-block 640 of the analog module 601. The digital module 602 arranges the digital equivalent blocks on a plurality of signal lines equal to the number of output lines of the analog block 601. The digital module 602 also includes a demultiplexer 680 for selecting one of the signal lines.

In this embodiment, the digital equivalent blocks are arranged on each signal line that bypasses the corresponding analog block. Therefore, using the configuration of FIG. 6 as an example, the top signal line does not bypass any of the analog component blocks, and therefore does not include any digital equivalent blocks. The middle signal line bypasses only the dual component block (C-block) 640, and therefore only includes the digital equivalent DC-block 670. Lastly, the bottom signal line bypasses both the replaceable analog component block (B-block) 630 and the dual analog component block (C-block) 640, and therefore includes both the digital equivalent DB-block 660 and DC-block 670. Each of the digital equivalent blocks is connected to the power control module 350 via a corresponding power-supply line 694-696.

In order to adjust power consumption of the receiver module 600, the power control module 350 supplies operation power to the component blocks in substantially the same way as discussed above with respect to the configuration of FIG. 5. However, in this embodiment, the power control module supplies both a resolution and an operation power to the A/D converters 650 through their corresponding resolution lines 690a-690c. With this configuration, the power control module 350 can select one of the signal lines simply by stopping supply of an operation power to any single element on each of the other lines. For example, by turning off A/D converters 650a and 650b, the power control module causes the signal to pass through the bottom signal line that is serving ADC 650c. In order to conserve power, the power control module 350 should also turn off the remaining components on the unused signal lines.

With this configuration, the receiver module no longer requires bypass modules for each of the replaceable component blocks. In addition, whereas switching power configurations in the serial configuration may cause signal distortion (due to the abrupt switches between power configurations), this configuration can prevent such distortions through use of the demultiplexer 680. For example, when switching from the third signal line to the second signal line, the power control module 350 can simultaneously supply power to both lines, while still selecting the third line at the demultiplexer 680. This allows the components of the second line to warm up and achieve steady state before being selected. Once at steady state, the power control module 350 causes the demultiplexer 680 to select the second line, at which time the power control module 350 turns off the components of the third line. This allows for a smooth transition among power configurations, and reduces signal distortion due to power configuration changes.

Those skilled in the relevant art(s) will recognize that many modifications may reasonably be made to the parallel configuration shown in FIG. 6 within the spirit and scope of the present invention. For example, because all components on a signal line will presumably be in an ON state or an OFF state together, each of their power-supply lines may be included in a single cower-supply bus.

A Third Exemplary Receiver Module

Figure 7A:
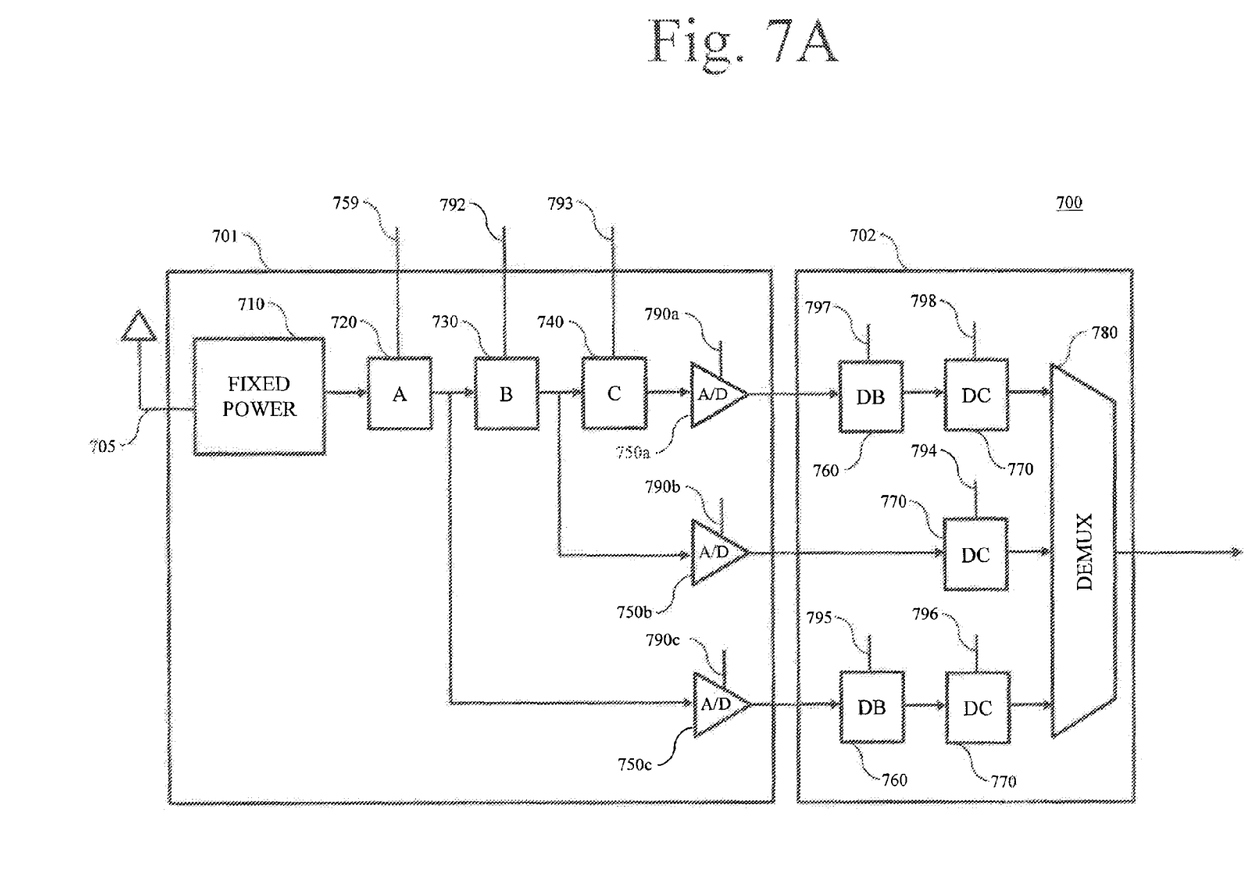
FIG. 7A illustrates a block diagram of a receiver module that is implemented as part of the wireless communication device according to an exemplary embodiment of the invention.

FIG. 7A illustrates a block diagram of a receiver module 700 that may be implemented as part of the wireless communication device 200 according to an exemplary embodiment of the invention. The receiver module 700 may represent an exemplary embodiment of the receiver module 220. For example, the receiver module 700 includes an analog module 701 that may represent an exemplary embodiment of the analog module 320, and includes a digital module 702 that may represent an exemplary embodiment of the digital module 330.

This "hybrid" embodiment includes a parallel configuration that allows for significantly more power configurations by also including a serial configuration. For example, the receiver module 700 of FIG. 7A includes a combination of the serial configuration shown in FIG. 5 and the parallel configuration shown in FIG. 6. Component A-block 720, B-block 730, and C-block 740 are each serially connected with digital equivalent DB-block 760 and DC-block 770. Although not illustrated (for simplicity), each of the B, C, DB and DC blocks also include a corresponding bypass module. A DC-block 770 is also connected in parallel with the C-block 740 and a DB-block 760 and DC-block 770 are connected in parallel with the B-block 730 and C-block 740. In this manner, many more power configurations are available by operating some of the blocks in either bypass or active mode, and operating other blocks based on a selected line of the parallel configuration.

The fixed power block 710, power-supply lines 791-798, A/D converters 750a-750c, resolution lines 790a-790c, and demultiplexer 780 each operate in the same or similar manner to the similarly-named elements described above with respect to FIG. 6.

Figure 7B:
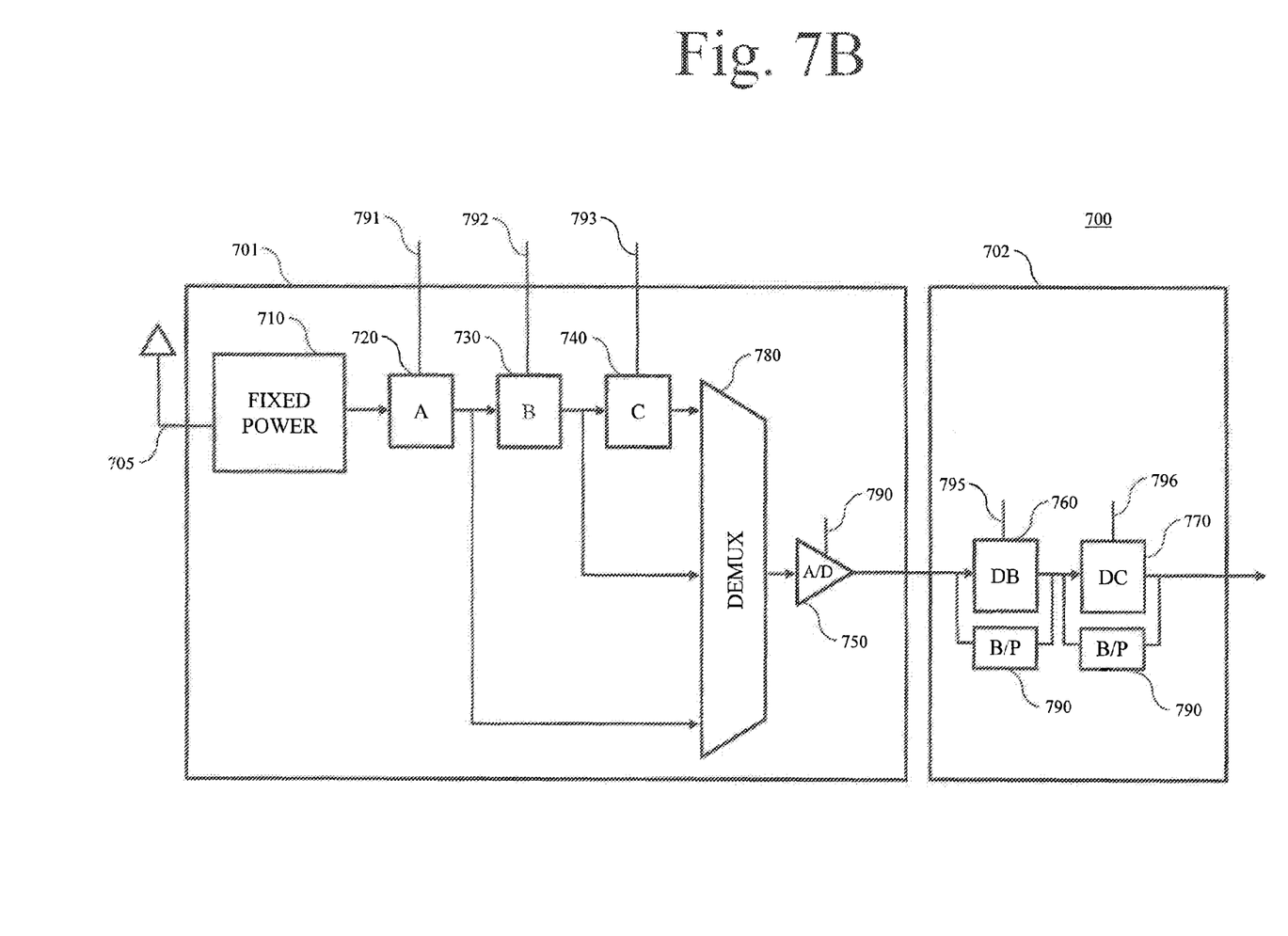
FIG. 7B illustrates a block diagram of a receiver module that is implemented as part of the wireless communication device according to a third exemplary embodiment of the invention.

FIG. 7B illustrates a block diagram of an alternative hybrid configuration of a receiver module 700 that may be implemented as part of the wireless communication device 200 according to an exemplary embodiment of the invention. The receiver module 700 may represent an exemplary embodiment of the receiver module 220. For example, the receiver module 700 includes an analog module 701 that may represent an exemplary embodiment of the analog module 320, and includes a digital module 702 that may represent an exemplary embodiment of the digital module 330.

As discussed above, the serial receiver module configuration of FIG. 5 and the parallel receiver module configuration of FIG. 6 each have their own benefits over the prior art. However, each also may include minor limitations with respect to the other. For example, although the serial configuration requires minimal chip space due to its simplistic architecture, it may cause signal distortion during power configuration switching. Similarly, although the parallel configuration reduces signal distortion during power switching, it requires much more chip space than the serial configuration due to the multiple signal lines. Therefore, in the third embodiment, the receiver module 700 may have a hybrid configuration that moderates between reduced signal distortion and chip space.

For example, in the receiver module 700 of FIG. 7B, the analog module 701 includes the demultiplexer 780 and a single A/D converter 750 having a single resolution line 790. With this configuration, the analog module 701 does not require any bypass modules for the individual component blocks and has only a single output. The digital equivalent component DB-block 760 and DC-block 770 each include a corresponding bypass module 791a and 791b, respectively, and are controlled based on the selected line. In other words, the analog module 701 maintains a parallel configuration and the digital module 702 maintains a serial configuration. With this configuration, the receiver module 700 achieves smooth power configuration transitions within the analog module 701, and reduces chip space required by the digital module 702.

Those skilled in the relevant art(s) will recognize that many alternative hybrid configurations can be implemented in the receiver module 700 depending on the specific application and design limitations. For example, the analog module 701 can include a serial configuration and the digital module can 702 can include a parallel configuration. Alternatively, portions of the each of the analog module 701 and the digital module 702 can include serial configurations, and other portions can include parallel configurations.

An Exemplary Method of Transmitting an Emergency Signal

Figure 8:
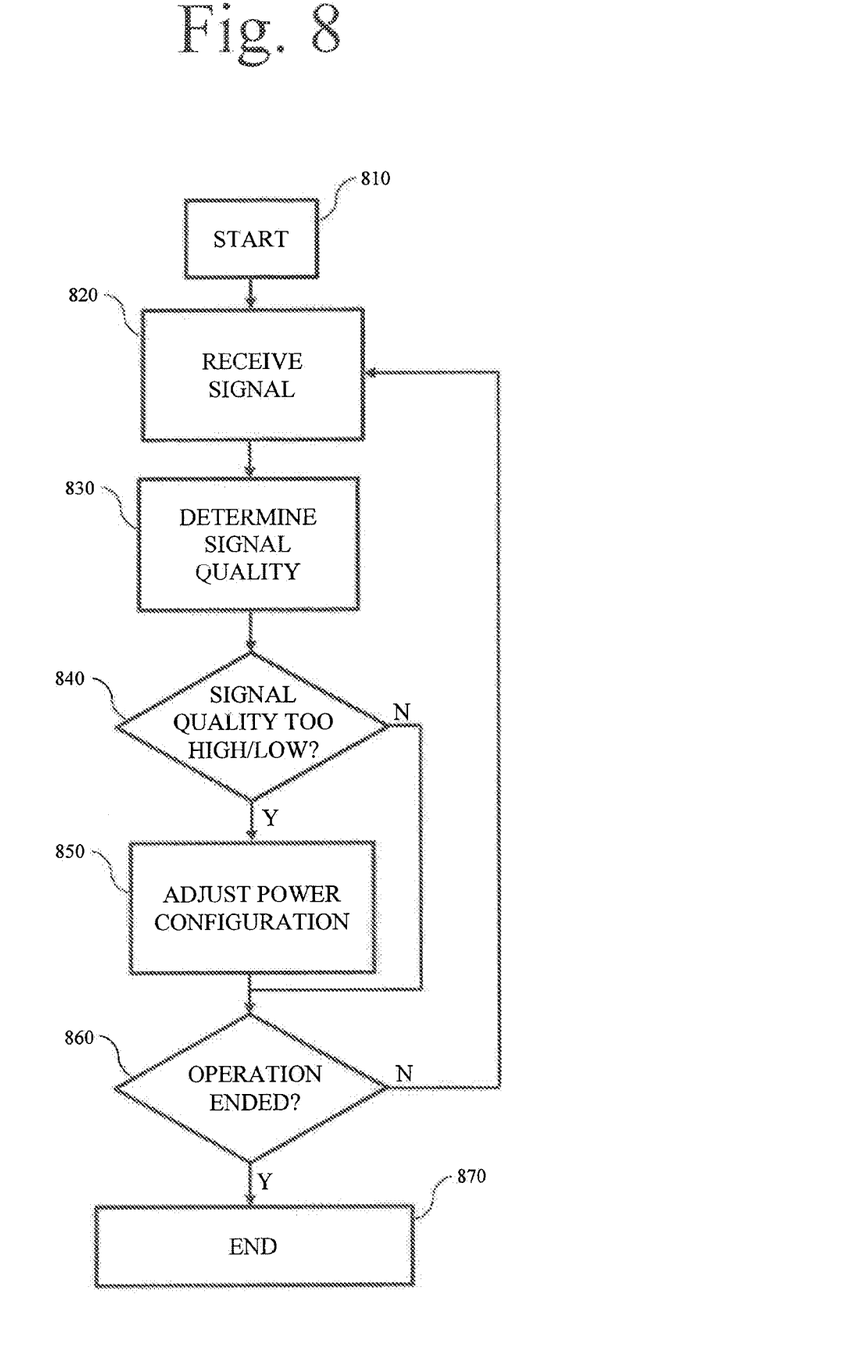
FIG. 8 illustrates a block diagram of a method for reducing power consumption in a wireless communication device according to an exemplary embodiment of the invention.

FIG. 8 illustrates a block diagram of a method for reducing power consumption in a wireless communication device according to an exemplary embodiment of the invention.

The method begins at step 810 and immediately proceeds to step 820. At step 820, the wireless communication device receives a signal from a wireless communication environment. The method then proceeds to step 830. At step 830, a signal quality of the received signal is determined. The signal quality can be determined based on SNR, bit error rate, signal magnitude, or based on any other method within the spirit and scope of the present invention. The method then proceeds to step 840.

In step 840, a determination is made as to whether the signal quality of the received signal is higher or lower than necessary. If it is determined that the signal quality is within a preferred quality range (neither too high nor too low for a current performance level), the method proceeds directly to step 860. Alternatively, if it is determined that the signal quality is outside the preferred quality range (is either too high or too low for the current performance level), the method proceeds to step 850. In step 850, a power consumption of the wireless communication device is adjusted based on the signal quality. For example, if the signal quality is higher than necessary, the power consumption is reduced. Alternatively, if the signal quality is lower than necessary, the power consumption is increased. The method then proceeds to step 860.

In step 860, the method determines whether the power consumption adjustment operation has ended. Preferably the operation continues to run so long as wireless communication device continues to receive signals from the wireless communication environment. If the operation has not ended, the method returns to step 820. Alternatively, if the operation has ended, the method proceeds to step 870, where the method ends.

Those skilled in the relevant art(s) will recognize that the method can additionally or alternatively include any of the functionality of the first wireless communication device 200 discussed above, and the above description of the exemplary method should neither be construed to limit the method nor the description of the first wireless communication device 200.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless communication device, comprising:
   a receiver module configured to receive a signal;
   a signal quality review module configured to determine a signal quality of the received signal;
   an analog module that includes a replaceable analog component;
   a digital module that includes a digital component that functions as a digital equivalent of the replaceable analog component;
   an analog-to-digital converter connected between the replaceable analog component and the digital component; and
   a power control module configured to control a power consumption of the receiver module by switching between operation of the replaceable analog component and operation of the digital component based on the determination by the signal quality review module.

2. The wireless communication device of claim 1, wherein the analog module further includes an adjustable analog component that is capable of operating at multiple different operating powers, and
   the power control module controls the power consumption of the receiver module by adjusting an operating power of the adjustable analog component based on the determination by the signal quality review module.

3. The wireless communication device of claim 1, wherein the analog-to-digital converter is capable of operating at an adjustable bit resolution, and
   the power control module controls the power consumption of the receiver module by adjusting the bit resolution of the analog-to-digital converter based on the determination by the signal quality review module.

4. The wireless communication device of claim 1, wherein the analog module further includes an adjustable analog component that is capable of operating at multiple different operating powers, and
   the power control module controls the power consumption of the receiver module by at least one of (1) adjusting an operating power of the adjustable analog component, and (2) switching between operation of the replaceable analog component and operation of the digital component, based on the determination by the signal quality review module.

5. The wireless communication device of claim 4, wherein the adjustable analog component, the replaceable analog component, and the digital component are connected in series.

6. The wireless communication device of claim 4, wherein the digital component is connected parallel to the replaceable analog component.

7. The wireless communication device of claim 1, wherein the signal quality review module determines the signal quality of the received signal on a continuous (real-time) basis.

8. The wireless communication device of claim 1, wherein the received signal includes a plurality of data frames, and the signal quality review module determines the signal quality of the received signal on a frame-by-frame basis.

9. The wireless communication device of claim 1, wherein the received signal includes a plurality of data frames, and the signal quality review module determines the signal quality of the received signal on the basis of a group of data frames, each group including more than one frame from the plurality of frames.

10. The wireless communication device of claim 1, further comprising a plurality of power selection lines, wherein
    the analog module further includes a plurality of analog components that include the replaceable analog component,
    the receiver module includes a plurality of digital equivalent components that function as digital equivalents of the corresponding analog components and that include the digital component, the analog components are connected in series, and each of the digital equivalent components resides on a different power selection line, such that each of the digital equivalent components is connected in parallel with its corresponding analog component and with the other digital equivalent components.

11. The wireless communication device of claim 10, wherein the power control module controls the power consumption of the receiver module by selecting a power selection line among the plurality of power selection lines.

12. The wireless communication device of claim 11, wherein when the power control module transitions from selecting a first power selection line among the plurality of power selection lines to selecting a second power selection line from among the plurality of power selection lines, the power control module temporarily supplies an operation power to both the components of the first power selection line and the components of the second power selection line.

13. The wireless communication device of claim 1, wherein the power control module controls the power consumption of the receiver module by referring to a Look-Up Table (LUT) based on the determined signal quality.

14. The wireless communication device of claim 1, wherein when the determined signal quality exceeds a first threshold, the power control module reduces the power consumption of the receiver module, and when the determined signal quality is below a second threshold, the power control module increases the power consumption of the receiver module.

15. The wireless communication device of claim 1, wherein when the signal quality of the received signal is determined to be above a predetermined threshold, the power control module is configured to switch off the replaceable analog component and switch on the digital component.

16. The wireless communication device of claim 1, wherein when the signal quality of the received signal is determined to be below a predetermined threshold, the power control module is configured to switch off the digital component and switch on the replaceable analog component.

17. A wireless communication device, comprising:

a receiver module configured to receive a signal;

a signal quality review module configured to determine a signal quality of the received signal;

an analog module that includes a replaceable analog component;

a digital module that includes a digital component that functions as a digital equivalent of the replaceable analog component;

an analog-to-digital converter connected between the replaceable analog component and the digital component; and a power control module configured to control a power consumption of the receiver module based on the determination by the signal quality review module, wherein when the signal quality of the received signal is determined to be above a predetermined threshold, the power control module is configured to switch off the replaceable analog component and switch on the digital component.

18. A wireless communication device, comprising:

a receiver module configured to receive a signal;

a signal quality review module configured to determine a signal quality of the received signal;

an analog module that includes a replaceable analog component;

a digital module that includes a digital component that functions as a digital equivalent of the replaceable analog component;

an analog-to-digital converter connected between the replaceable analog component and the digital component; and a power control module configured to control a power consumption of the receiver module based on the determination by the signal quality review module, wherein when the signal quality of the received signal is determined to be below a predetermined threshold, the power control module is configured to switch off the digital component and switch on the replaceable analog component.

\* \* \* \* \*